No. 30,063.   PATENTED SEPT. 18, 1860.
R. HEMINGRAY.
MOLD FOR GLASS JARS.
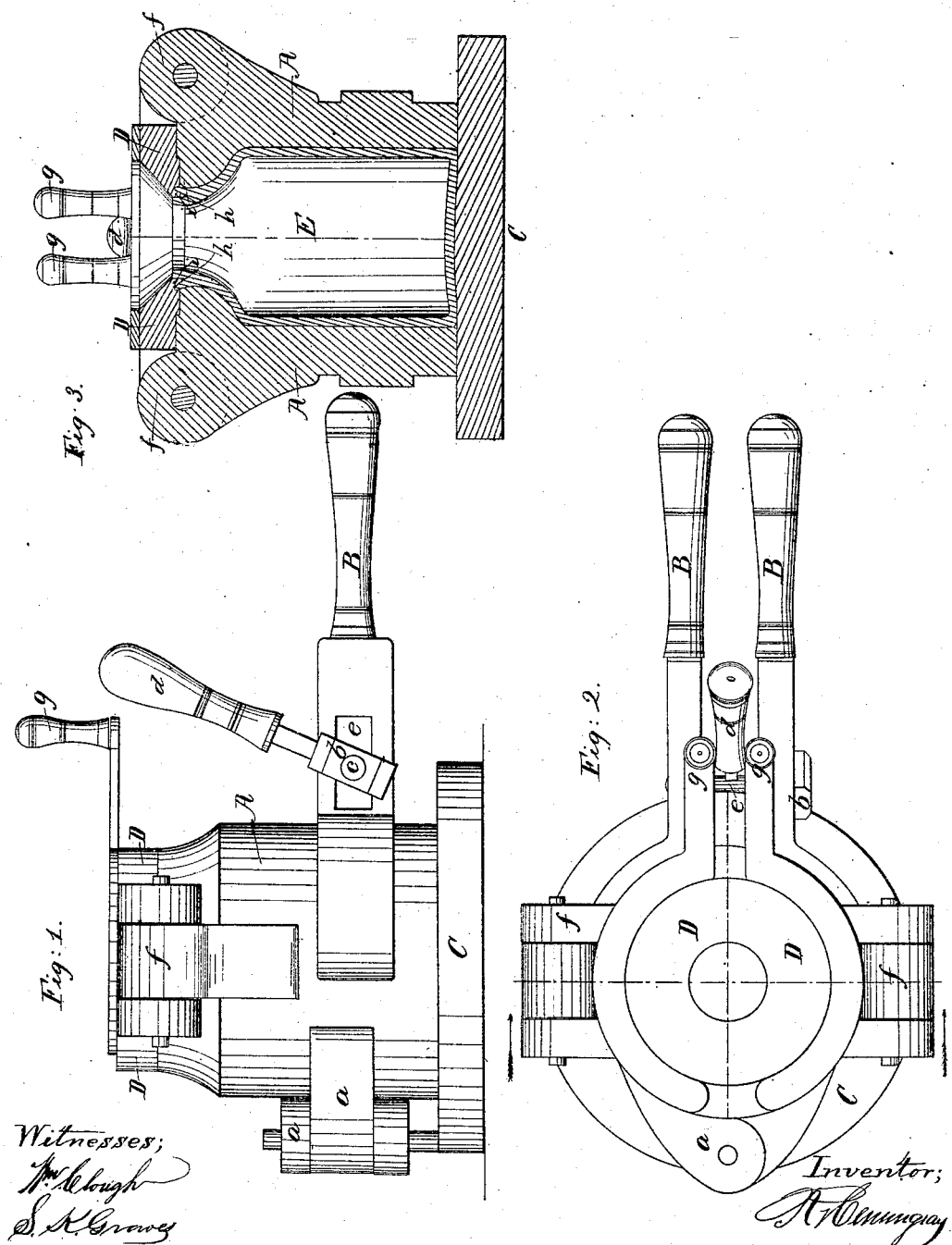

UNITED STATES PATENT OFFICE.

R. HEMINGRAY, OF COVINGTON, KENTUCKY.

MOLD FOR GLASS JARS.

Specification of Letters Patent No. 30,063, dated September 18, 1860.

*To all whom it may concern:*

Be it known that I, ROBT. HEMINGRAY, of Covington, in the county of Kenton and State of Kentucky, have invented a new and useful Improvement in Molds for Glass Jars; and I do hereby declare that the following is a full, clear, and exact description of the same, reference being had to the accompanying drawings, and to the letters of reference marked thereon, forming a part of this specification.

My invention relates to molds for molding the kind of glass fruit jars which have an annular groove around the opening or top to receive the flange of a cap and the wax which is used in sealing the jar.

It consists in making the mold in four parts so hinged together as that two parts open vertically and two parts open horizontally for the purpose of releasing the jar with its annular groove around the top from the mold after it has been formed therein as will be hereafter described.

Figure 1, is an elevation of the mold. Fig. 2, is a plan of the same. Fig. 3, is a vertical section of the mold in which a glass jar is represented.

Like letters of reference indicate corresponding parts in all the drawings.

The main part of the mold or that which incloses the body and neck of the jar consists of two parts, A, A, which are connected by the hinge *a*, permitting them to be opened laterally by the handles B, B, which are formed in one part respectively with the two parts of the mold. When the mold is closed the stem *c*, which enters one of the handles B by a screw thread has a button *b*, upon its other end which passes through the slot *e*, in the other handle B, and is rotated partly around by the handle *d*, causing the two parts of the mold to be firmly clamped together.

C, is a base upon which the mold is placed and to which one part thereof is secured.

D, D, are two parts of the mold which are united to the principal parts A, A, by the hinges *f*, *f*, and the connection of the latter with the former is such that the parts D, D, turning upon the hinges *f*, *f*, open upwardly and outwardly when operated by the handles *g*, *g*.

The interior form of the mold corresponding with the outer form of the jar is represented in Fig. 3.

*h*, is the annular groove which extends around the opening or mouth of the jar E, and this is formed by a corresponding projection *i* upon the inner surface of the parts D, D, of the mold; and when the parts D, D, are opened upwardly and outwardly after the jar has been formed within the mold, and before the parts A, A, are opened the projection upon the parts D, which forms the groove *h*, is withdrawn therefrom without injury to the jar. After which the parts A, A, may be opened and the jar entirely released from the mold.

In making jars of the form herein represented, having the groove *h*, surrounding the mouth of the jar it has been customary to mold the body and neck of the jar in molds of two parts essentially like the parts A, A, of the mold herein described. After the jar has been thus formed and removed from the mold a portion of melted glass is taken and united to the top of the jar and the annular groove is then impressed into the plastic glass by a tool adapted to the purpose. This process is necessarily slow and laborious and the work when completed is not so uniform and complete as when the jar is finished in the mold and at one operation.

In using my molds the operator having taken an appropriate quantity of glass upon the tube, it is inserted into the mold which is closed and clamped together by means of the button *b*, and stem *c*. The glass is then blown by the operator until the mass is expanded and entirely fills the mold, forming the body and neck of the jar and filling the parts of the mold around the mouth when the groove *h*, is formed so that the jar is complete and entire. An attendant who has during the operation of blowing, held the molds by the handles *g*, *g*, now opens the parts D, D, by rotating them upwardly and outwardly on their hinges, thus withdrawing the projection *i* upon the under surface of the parts D, D, from the groove *h*, without impairing the jar, next he unclasps the parts A, A, by rotating the button *b*, to a position which will permit it to pass through the slot *e*, and opening the parts A, A, by the handles B, B, allows the jar to be removed by the principal operator, whose blow pipe still remains connected with the jar by a thin film of glass which extends up from the jar through the opening in the top of the mold. The jar is then conveyed to a place for its reception, where it is deposited with a slight blow or concussion which breaks the thin film of glass and releases the jar without injury, from the blow pipe.

I do not claim as my invention the use of molds made in hinged parts which open to release the jar that has been formed in the mold, apart from the specific construction and purpose of the hinged parts herein described, but, Having described my invention, what I desire to secure by Letters Patent is—

The mold herein described for molding such jars as have an annular groove $h$, surrounding the mouth of the jar; consisting of the parts D, D, having an annular projection $i$ for the purpose of forming the groove $h$, so hinged or connected with the parts A, A, of the mold as to open upwardly while the parts A, A, subsequently open laterally, thus releasing the jar from the mold and permitting the same to be removed without injury substantially as set forth.

R. HEMINGRAY.

Witnesses:
  Wm. Clough,
  S. K. Graves.